United States Patent
Bindl et al.

(10) Patent No.: US 9,561,715 B2
(45) Date of Patent: Feb. 7, 2017

(54) WHEEL HUB WITH ELECTRIC MOTOR

(71) Applicant: Deere & Company, Moline (IL)

(72) Inventors: Reginald M. Bindl, Dubuque, IA (US); Keith Rodrigues, Carmona (IN)

(73) Assignee: DEERE & COMPANY, Moline, IL (US)

( * ) Notice: Subject to any disclaimer, the term of this patent is extended or adjusted under 35 U.S.C. 154(b) by 853 days.

(21) Appl. No.: 13/679,262

(22) Filed: Nov. 16, 2012

(65) Prior Publication Data
US 2014/0139009 A1 May 22, 2014

(51) Int. Cl.
| | | |
|---|---|---|
| *B60K 1/00* | (2006.01) | |
| *B60K 7/00* | (2006.01) | |
| *B60K 17/04* | (2006.01) | |
| *B60K 17/30* | (2006.01) | |

(52) U.S. Cl.
CPC ........... *B60K 7/0007* (2013.01); *B60K 17/046* (2013.01); *B60K 17/303* (2013.01); *B60K 7/0015* (2013.01); *B60K 2007/0038* (2013.01); *B60K 2007/0092* (2013.01); *B60Y 2200/411* (2013.01)

(58) Field of Classification Search
CPC ......... B60K 7/007; B60K 7/00; B60K 17/043; B60K 17/046; B60K 17/303
USPC .................................... 180/65.51, 65.1, 65.6
See application file for complete search history.

(56) References Cited

U.S. PATENT DOCUMENTS

| | | | | |
|---|---|---|---|---|
| 4,991,698 A * | 2/1991 | Hanson | ................... | B60B 9/005 |
| | | | | 188/380 |
| 5,472,062 A * | 12/1995 | Nagai | ...................... | B60G 3/00 |
| | | | | 180/252 |
| 6,491,600 B1 * | 12/2002 | Smemo | ................ | B60K 7/0015 |
| | | | | 475/83 |
| 6,852,061 B2 * | 2/2005 | Schoon | ................ | B60K 7/0007 |
| | | | | 180/65.51 |
| 6,942,049 B2 * | 9/2005 | Shimizu | ............... | B60K 7/0007 |
| | | | | 180/253 |
| 7,128,327 B2 * | 10/2006 | Kawamata | ............. | B60G 7/006 |
| | | | | 267/257 |
| 7,306,065 B2 * | 12/2007 | Nagaya | .................... | B60G 3/20 |
| | | | | 180/65.51 |
| 7,420,301 B2 * | 9/2008 | Veny | .................... | B60K 7/0007 |
| | | | | 180/65.51 |
| 7,622,836 B2 * | 11/2009 | DeVeny | ............... | B60K 7/0007 |
| | | | | 180/65.51 |
| 7,717,203 B2 * | 5/2010 | Yoshino | ............... | B60K 7/0007 |
| | | | | 180/65.51 |
| 7,717,443 B1 * | 5/2010 | Carlson | .................... | B60G 3/01 |
| | | | | 280/124.155 |
| 7,766,110 B2 * | 8/2010 | Suzuki | .................... | B60G 3/01 |
| | | | | 180/65.31 |
| 7,958,959 B2 * | 6/2011 | Yogo | ........................ | B60G 3/20 |
| | | | | 180/65.51 |

(Continued)

*Primary Examiner* — James M Dolak
(74) *Attorney, Agent, or Firm* — Taft Stettinius & Hollister, LLP; Stephen F. Rost

(57) ABSTRACT

The present disclosure provides a final drive assembly for powering a wheel of a machine. The final drive assembly includes a hub adapted to support the wheel, a spindle casting coupled to the hub and a bearing disposed within the hub. The spindle casting at least partially defines a steering axis about which the wheel pivots. The final drive assembly also includes an electric motor disposed within the bearing, the electric motor positioned between the spindle casting and hub.

19 Claims, 6 Drawing Sheets

(56) References Cited

U.S. PATENT DOCUMENTS

| | | | |
|---|---|---|---|
| 8,100,806 B2* | 1/2012 | Shibukawa | B60K 7/00 180/65.6 |
| 8,459,386 B2* | 6/2013 | Pickholz | B60K 7/0007 180/65.31 |
| 8,640,812 B2* | 2/2014 | Bindl | B60K 7/00 180/255 |
| 8,857,545 B2* | 10/2014 | Lee | B60K 7/0007 180/242 |
| 9,126,476 B2* | 9/2015 | Takahashi | B60K 7/0007 |
| 9,132,723 B2* | 9/2015 | Munster | B60K 7/0007 |
| 9,205,737 B2* | 12/2015 | Witcher | B60K 17/046 |
| 9,206,850 B2* | 12/2015 | Takahashi | B60K 7/0007 |
| 9,216,648 B2* | 12/2015 | Ishizuka | B60K 17/043 |
| 9,233,602 B2* | 1/2016 | Mair | B60K 7/0007 |
| 9,233,603 B2* | 1/2016 | Heinen | B60K 7/0007 |
| 9,233,604 B2* | 1/2016 | Yamamoto | B60K 17/046 |
| 9,248,733 B2* | 2/2016 | Mair | B60K 11/00 |
| 9,252,641 B2* | 2/2016 | Ishizuka | H02K 7/1028 |
| 9,266,557 B2* | 2/2016 | Matayoshi | B60G 3/20 |
| 9,331,546 B2* | 5/2016 | Kim | H02K 7/14 |
| 9,358,874 B2* | 6/2016 | Fraser | B60K 7/0007 |
| 9,381,802 B2* | 7/2016 | Figuered | B60K 7/0007 |
| 9,387,758 B2* | 7/2016 | Heinen | B60K 7/0007 |
| 9,403,429 B2* | 8/2016 | Baumgartner | B60K 7/0007 |
| 9,434,229 B2* | 9/2016 | Hilton | B60G 17/08 |
| 9,434,413 B1* | 9/2016 | Keller | B60K 17/30 |
| 9,435,419 B2* | 9/2016 | Hoebel | F16H 7/06 |
| 9,440,488 B1* | 9/2016 | Mothafar | B60B 19/00 |
| 2006/0219449 A1* | 10/2006 | Mizutani | H02K 9/19 180/65.51 |

\* cited by examiner

WHEEL HUB WITH ELECTRIC MOTOR

FIELD OF THE DISCLOSURE

The present disclosure relates to a front wheel axle of a work vehicle, and in particular, to a compact packaging arrangement of an electric motor in a final drive.

BACKGROUND OF THE DISCLOSURE

Work vehicles, such as a motor grader, can be used in construction and maintenance for creating a flat surface. When paving a road, a motor grader can be used to prepare a base foundation to create a wide flat surface for asphalt to be placed on. A motor grader can include two or more axles, with an engine and cab disposed above the axles at the rear end of the vehicle and another axle disposed at the front end of the vehicle. A blade is attached to the vehicle between the front axle and rear axle.

The present disclosure is not exclusively directed to a motor grader, but rather can extend to other powered vehicles as well. For exemplary and illustrative purposes, however, the present disclosure will focus on a motor grader. In FIG. 1, for example, a conventional motor grader 100, such as the 772G Motor Grader manufactured and sold by Deere & Company, includes front and rear frames 102 and 104, respectively, with the front frame 102 being supported on a pair of front wheels 106, and with the rear frame 104 being supported on right and left tandem sets of rear wheels 108. An operator cab 110 is mounted on an upwardly and forwardly inclined rear region 112 of the front frame 102 and contains various controls for the motor grader 100 disposed so as to be within the reach of a seated or standing operator, these controls including a steering wheel 114 and a lever assembly 116. An engine 118 is mounted on the rear frame 104 and supplies power for all driven components of the motor grader 100. The engine 118, for example, can be configured to drive a transmission (not shown), which is coupled for driving the rear wheels 108 at various selected speeds and either in forward or reverse modes. A hydrostatic front wheel assist transmission (not shown) may be selectively engaged to power the front wheels 106, in a manner known in the art.

Mounted to a front location of the front frame 102 is a drawbar 120, having a forward end universally connected to the front frame 102 by a ball and socket arrangement 122 and having opposite right and left rear regions suspended from an elevated central section 124 of the front frame 102 by right and left lift linkage arrangements including right and left extensible and retractable hydraulic actuators 126 and 128, respectively. A side shift linkage arrangement is coupled between the elevated frame section 124 and a rear location of the drawbar 120 and includes an extensible and retractable side swing hydraulic actuator 130. A blade 132 is coupled to the front frame 102 and powered by a variable displacement circle drive motor 134.

Referring to FIG. 2, a front axle 200 of the conventional motor grader 100 is shown in greater detail. The front axle 200 includes a first side 202 and second side 204 to which front wheels 106 are coupled. A portion 206 of the front frame 102 is shown in which the first side 202 and second side 204 each include a final drive assembly 208. In this conventional grader, a hydraulic motor (not shown) is disposed in the final drive assembly 208 to drive the corresponding front wheel. In other words, a hydraulic motor (not shown) is mounted at the first end 202 and second end 204 of the front axis 200. A wiring and hydraulic hose bundle 218 is coupled to each hydraulic motor and passes through the front frame 102 at different locations. The bundle 218 also attaches to different portions of the vehicle.

To achieve complete motion, a lean bar 210 is coupled to the front frame 102 and lean castings 214. A steering casting 212 is also disposed at each end of the front axle 200 to allow the front wheels 106 to steer about a steer pivot. A guard 216 is also provided at each end adjacent the final drive assembly 208. The configuration of the front axle 200 is such that sufficient clearance is provided between a ground surface and the axis 200 to aid with vehicle performance.

New technology, however, is being introduced to convert a conventional motor grader into an electric drive motor grader. This is not exclusive to motor graders, but rather other powered vehicles are being converted to electric drive as well. Previous attempts to convert a hydrostatic system to an electric drive system, particularly with respect to a motor grader, require the wheel hub and final drive assembly of the grader to be reconfigured to accommodate an electric motor. This is the result of the electric motor being larger in size (i.e., diameter and width) compared to a hydraulic motor. Thus, packaging the electric motor within a conventional final drive assembly is problematic due to space constraints.

A need therefore exists to provide a reconfigured package of a wheel hub of a front axle that includes an electric motor and that satisfies space constraints without changing the design of the wheel hub and castings of the front axle. It is further desirable to provide a package that achieves complete vehicle performance, including the ability to achieve desired rotation about the lean axis and steering axis through a full range of angles.

SUMMARY

In an exemplary embodiment of the present disclosure, a final drive assembly is provided for powering a wheel of a machine. The final drive assembly includes a hub having an outer surface adapted to support the wheel, a spindle casting coupled to the hub and a bearing disposed within the hub. The spindle casting at least partially defines a steering axis about which the wheel pivots. The final drive assembly also includes an electric motor disposed within the bearing, the electric motor positioned between the spindle casting and hub.

In one aspect, the final drive assembly includes a floating seal disposed between the spindle casting and hub, where the seal at least partially surrounding the electric motor. In another aspect, the final drive assembly includes a shaft coupled to an output of the electric motor and a planetary gearset assembly coupled to the shaft. The planetary gearset assembly can include a sun gear, carrier, and ring gear disposed within the hub. In a different aspect, and unlike conventional packaging arrangements, the hub does not enclose a piston and clutch assembly.

In the present embodiment, the final drive assembly can include a lean casting coupled to the spindle casting and electric motor. The lean casting defines a lean axis about which the wheel pivots. Moreover, an end plate can be coupled between the electric motor and lean casting, where the end plate defines at least one opening for accessing an electrical portion of the motor. In a compact packaging arrangement, an outer surface of the hub defines a first plane and the end plate defines a second plane, such that the first plane and second plane being substantially parallel to one another. As such, the steering axis is disposed parallel to and between the first and second planes. In a related aspect, the bearing comprises a first bearing spaced from a second bearing, where at least one of the first bearing and second bearing partially surrounds the electric motor.

In another embodiment of the present disclosure, a final drive assembly is provided for an electric vehicle, where the electric vehicle includes at least one wheel. The final drive assembly includes a hub adapted to support the wheel, a spindle casting coupled to the hub, and a lean casting coupled to the spindle casting. The spindle casting at least partially defines a steering axis about which the wheel articulates and the lean casting defines a lean axis about which the wheel articulates. The final drive assembly includes a bearing disposed within the hub and an electric motor coupled to the lean casting and disposed between the spindle casting and hub. The bearing at least partially surrounds the electric motor.

In one aspect, a floating seal is disposed between the spindle casting and hub such that the seal at least partially surrounds the electric motor. In a related aspect, a cover is at least partially disposed between the hub and bearing and a retainer plate is disposed within the hub and coupled to the spindle casting. Here, the cover is positioned between the bearing and retainer plate. In another aspect, the hub does not enclose a piston and clutch assembly. However, in a different embodiment, the final drive assembly can include an end plate coupled between the electric motor and lean casting, where the end plate defines at least one opening for accessing an electrical portion of the motor.

In this embodiment, an outer surface of the hub defines a first plane and the end plate defines a second plane such that the first plane and second plane are substantially parallel to one another. In this arrangement, the steering axis is disposed parallel to and between the first and second planes. Moreover, the bearing comprises a first bearing spaced from a second bearing, where at least one of the first bearing and second bearing partially surrounds the electric motor.

In a different embodiment, a work machine includes a front axle having a first end and a second end, a wheel mounted at each of the first and second ends, and a final drive assembly coupled to each end of the axle. The final driving assembly includes a hub adapted to support the wheel, a spindle casting and a lean casting. The spindle casting is coupled to the hub and lean casting, where the spindle casting at least partially defines a steering axis about which the wheel articulates and the lean casting defining a lean axis about which the wheel articulates. The final drive assembly also includes a first bearing and a second bearing disposed within the hub, and an electric motor coupled to the lean casting and disposed between the spindle casting and hub. The at least one of the first bearing and second bearing partially surrounds the electric motor.

In one form of this embodiment, a floating seal is disposed between the spindle casting and hub, such that the seal at least partially surrounds the electric motor. In another form thereof, the final drive assembly does not include a clutch assembly. Moreover, an end plate is coupled to the electric motor. The end plate defines at least one opening for accessing an electrical portion of the motor. In this configuration, the hub defines a first plane and the end plate defines a second plane, where the first plane and second plane are substantially parallel to one another. In addition, the steering axis is disposed parallel to and between the first and second planes.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
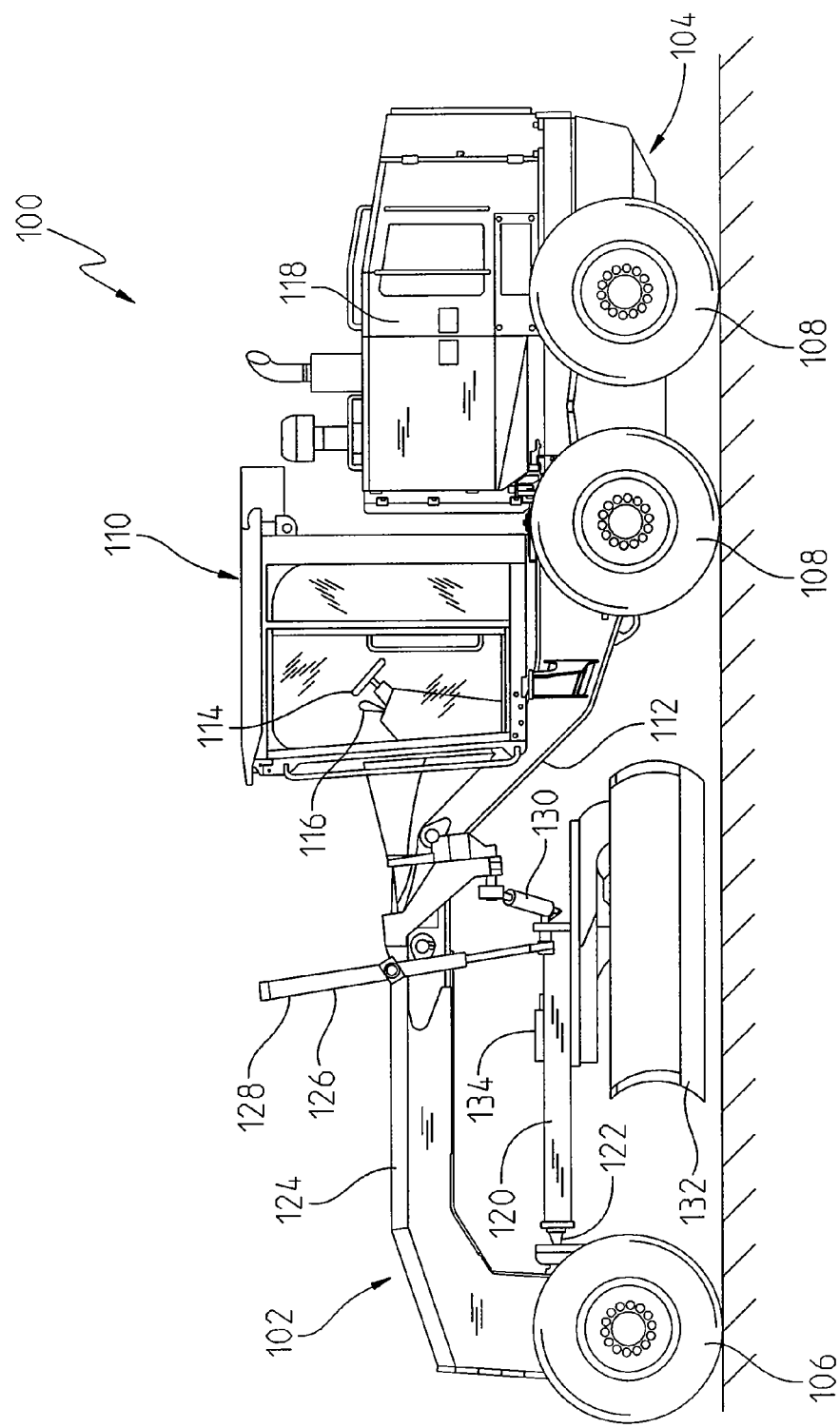
FIG. 1 is a side view of a conventional motor grader.
Figure 2:
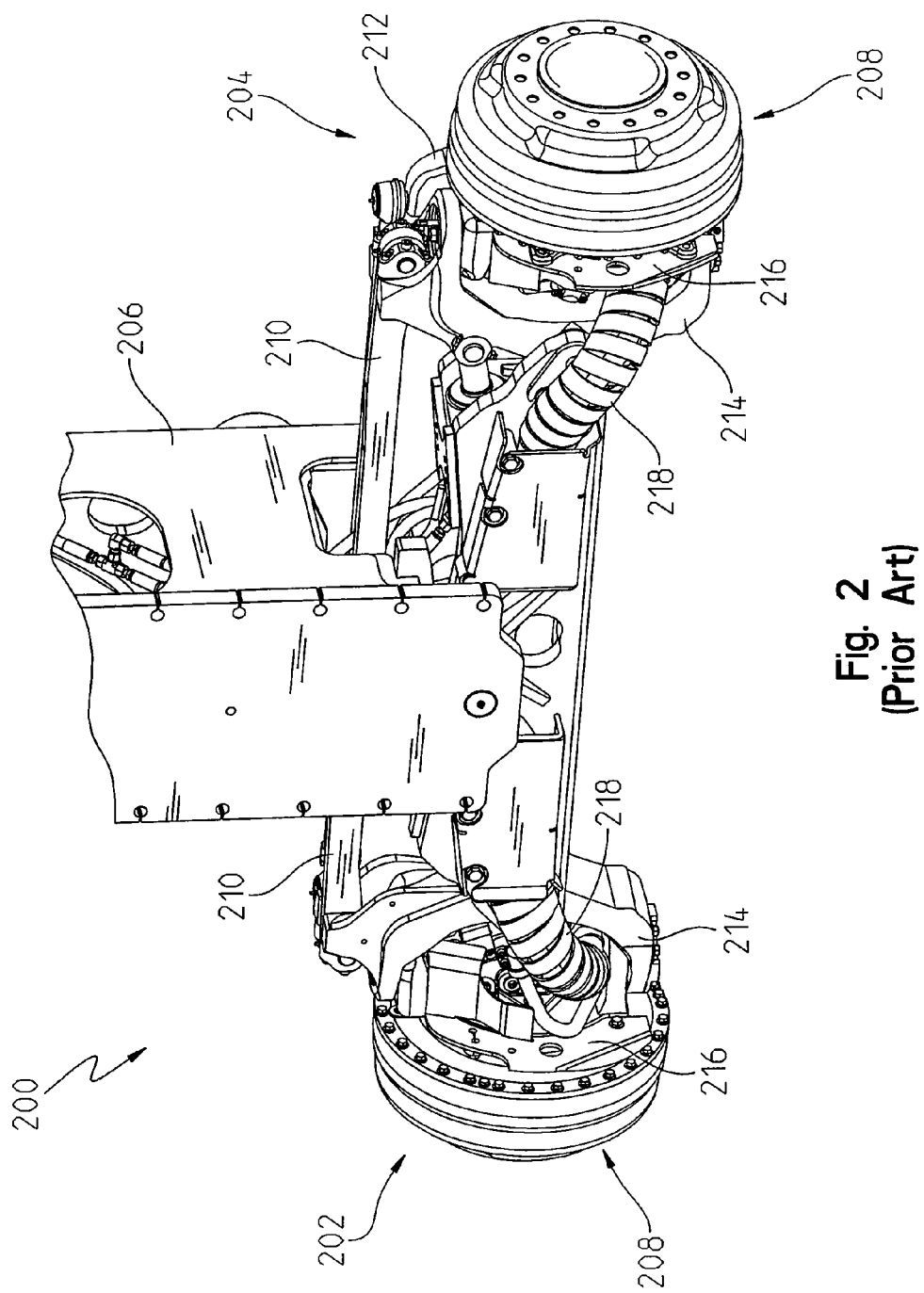
FIG. 2 is a perspective view of a front axle of the conventional motor grader of FIG. 1.
Figure 3:
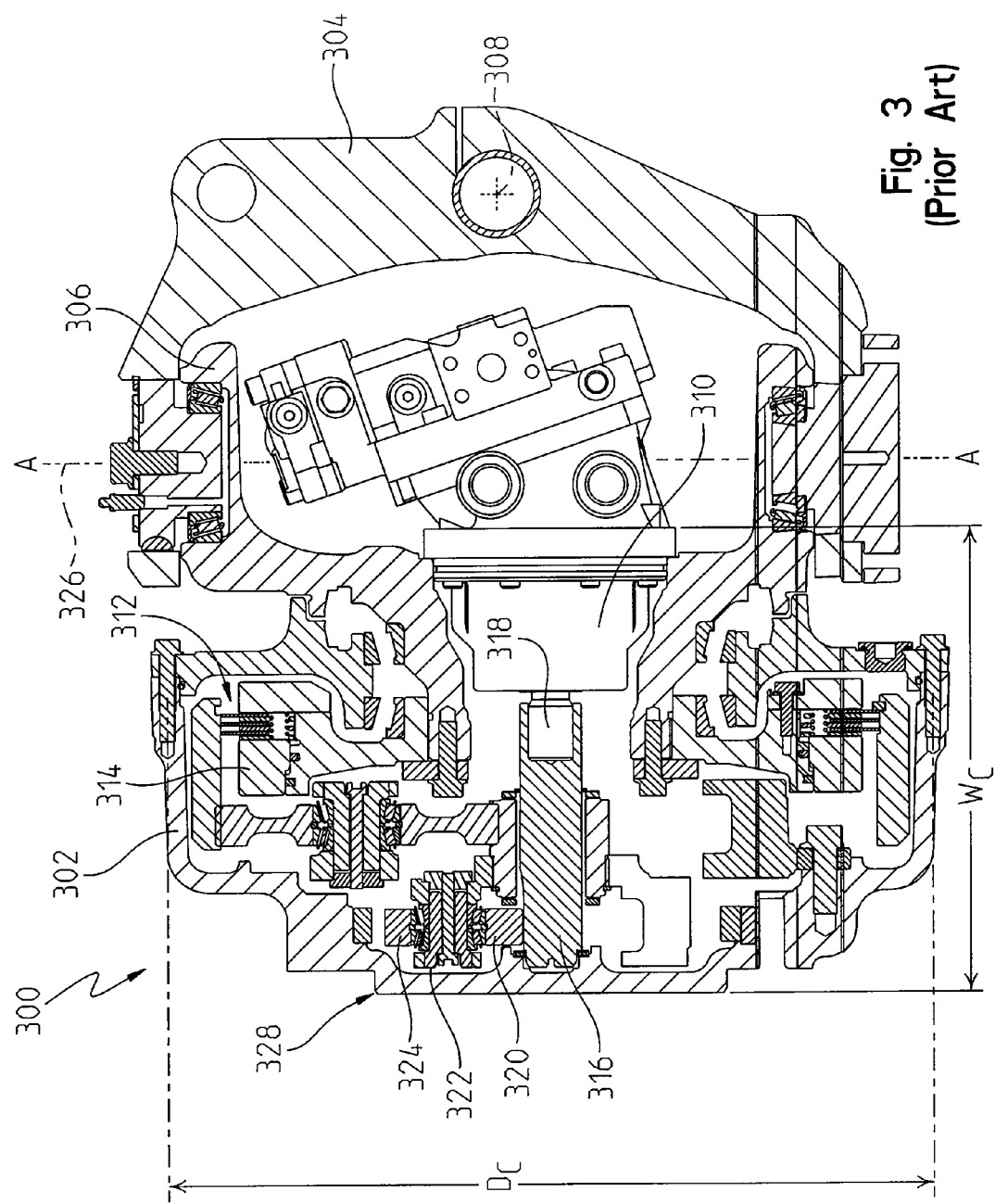
FIG. 3 is a cross-sectional view of a wheel hub and final drive assembly for a conventional motor grader.

Referring to FIGS. 2 and 3, a conventional final drive assembly 208 can include a planetary assembly 328 is driven by the hydraulic motor 310. The planetary assembly 328 includes a sun gear 320, carrier and pinion gears 322, and a ring gear 324. The motor 310 includes an output 318 that drives a shaft 316 to which the planetary assembly 328 is affixed. In FIG. 3, a portion of a conventional wheel hub 300 is shown having an outer drive hub 302. Both a lean casting 304 and spindle casting 306 are shown coupled to one another and to the drive hub 302. A lean axis 308 is defined with respect to the lean casting 304 and a steering axis 326 is defined with respect to the spindle casting 306 along line A-A as shown in FIG. 3.

Besides the hydraulic motor 310, the conventional wheel hub 300 includes a clutch assembly 312 formed by a plurality of clutch plates and separator plates. A piston 314 engages the clutch assembly 312 during machine operation. In the conventional packaging arrangement of FIG. 3, the machine can articulate about the steering axis by approximately 90°. To achieve these desired articulation angles, the conventional wheel hub 302 is designed to prevent interference between the lean casting 304 and spindle casting 306. As such, the hydraulic motor 310 is packaged within packaging constraints defined by a diametrical distance $D_C$ and a width distance $W_C$. The combination of the hydraulic motor 310, clutch assembly 312, piston 314, shaft 316 and planetary assembly 328 allows the conventional machine to achieve desired articulation about the lean axis 308 and steering axis 326.

To convert a motor grader or other machine into an electric drive machine, it is desirable to package an electric motor into a wheel hub similar to the one shown in FIG. 3 and maintain the same degree of articulation about the lean axis and steering axis. Unlike the hydraulic motor 310 of FIG. 3, however, an electric motor is generally larger and therefore occupies more space. As a result, there are several space constraints that prevent a hydraulic motor from simply being replaced by an electric motor. One space constraint, for example, relates to the clearance between the lean casting and spindle casting. Another space constraint relates to a width and diameter dimensions of a wheel hub (i.e., where the front wheel mounts to the wheel hub). These are further described below with respect to FIGS. 4-6.

Figure 4:
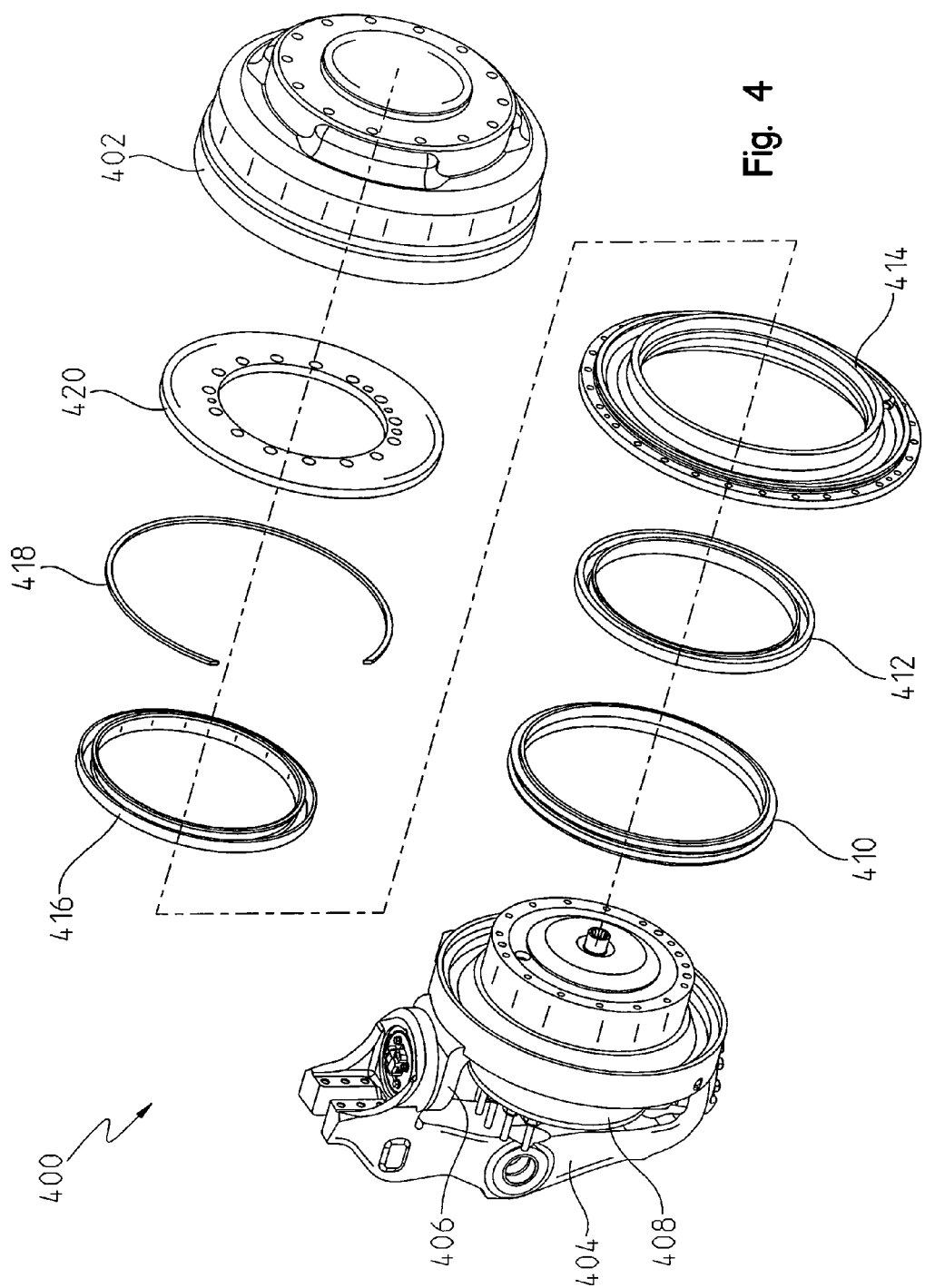
FIG. 4 is a partial exploded perspective view of a final drive assembly with an electric motor.
Figure 5:
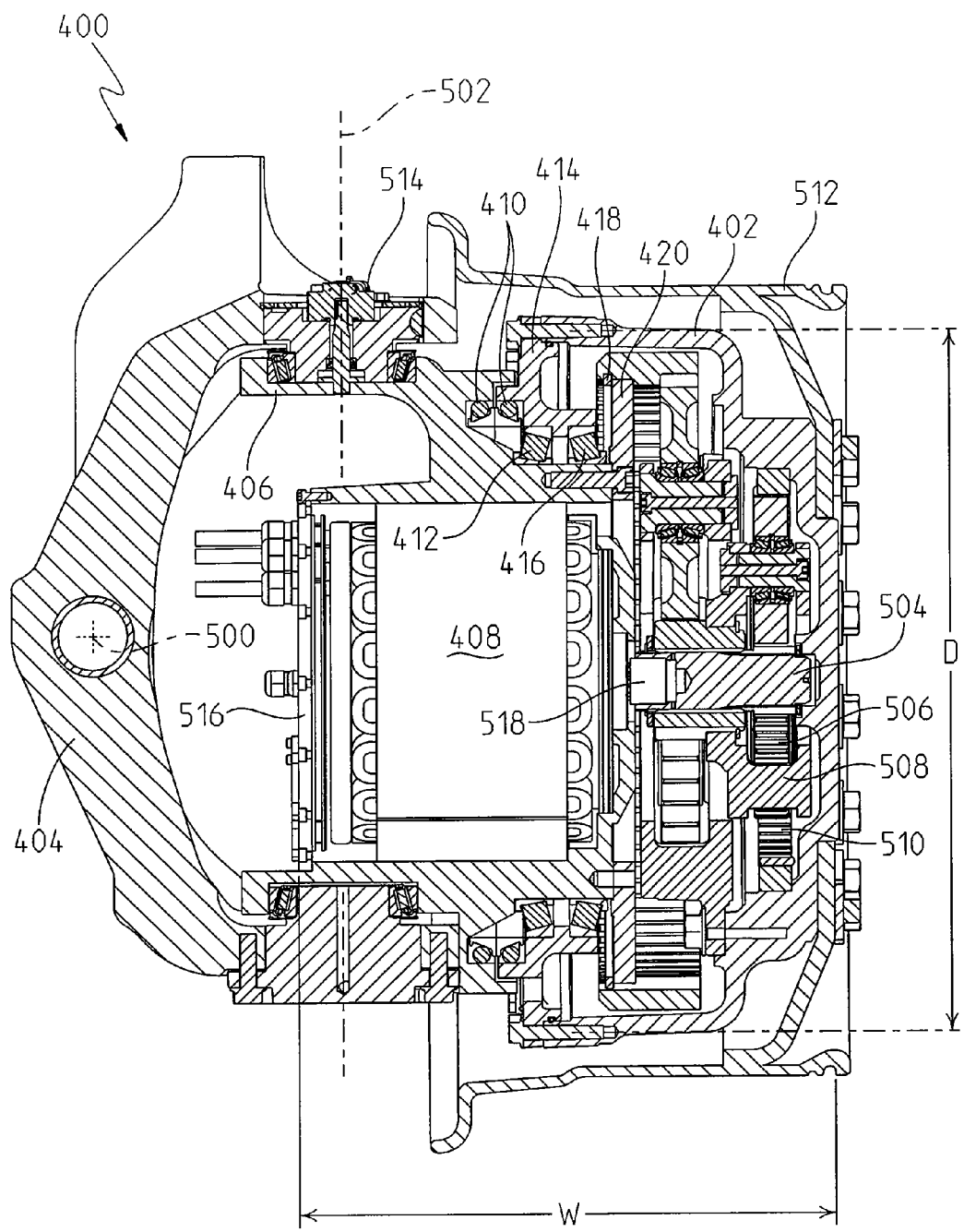
FIG. 5 is a partial cross-sectional view of a wheel hub and final drive assembly of FIG. 4.
Figure 6:
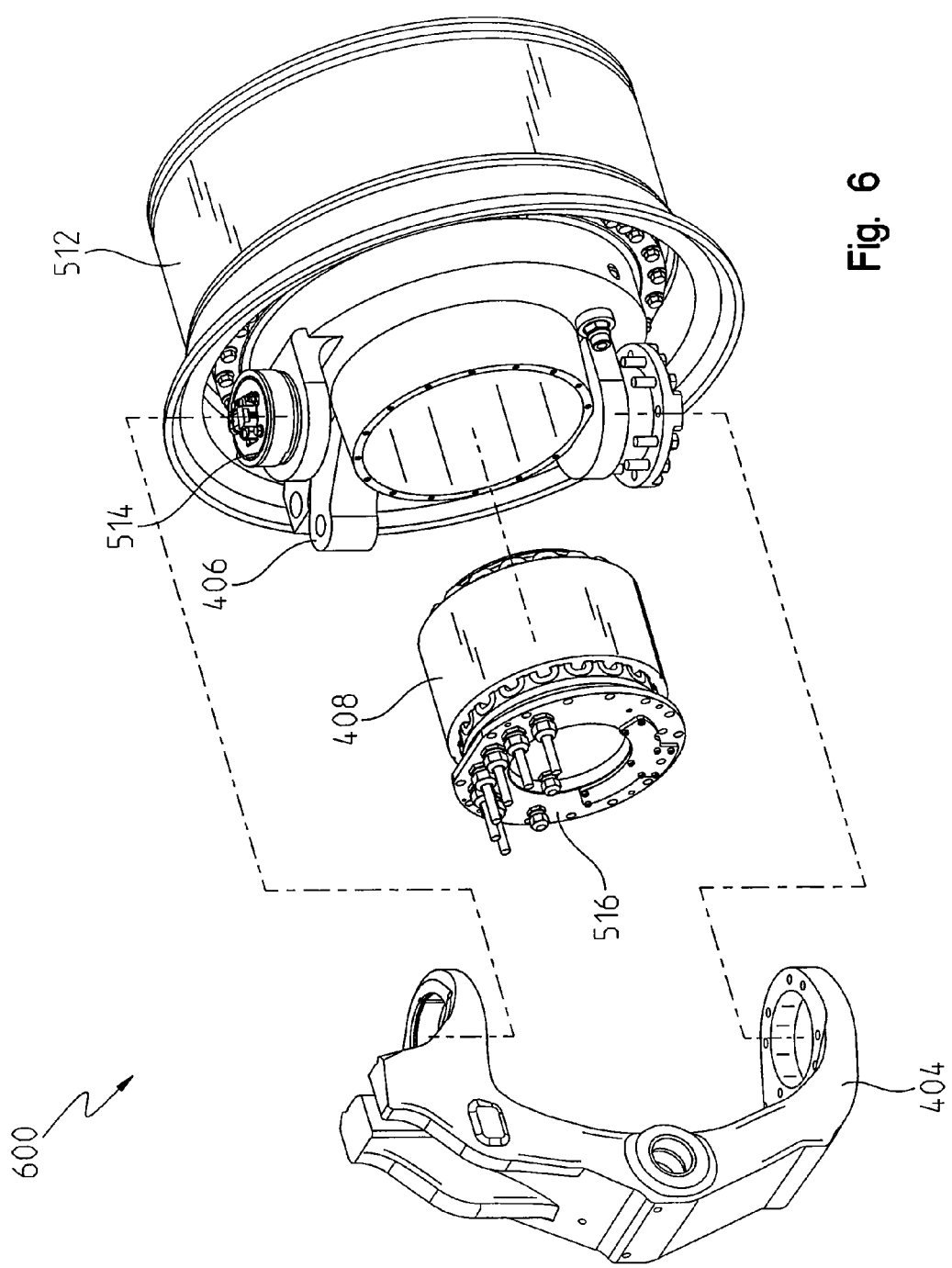
FIG. 6 is a partial exploded view of the wheel hub and final drive assembly of FIG. 5.

In FIGS. 4-6, an exemplary embodiment of a final drive assembly 400 and wheel hub assembly 600 are illustrated. The final drive assembly 400 can include a drive hub 402 having a similar size and design as the drive hub 302 of FIG. 3. The drive hub 402 can be substantially disposed within a wheel rim 512 as shown in FIGS. 5 and 6. The assembly 400 can further include a lean casting 404 which has a C-shape design, as shown in FIG. 6. Referring to FIG. 5, the lean casting 404 defines a lean axis 500 by which a front wheel can articulate. The final drive assembly 400 can also include a spindle housing or casting 406. A steering axis 502 is defined with respect to a steering kingpin 514 disposed in connection with the spindle casting 406. The lean casting 404 and spindle casting 406 are substantially similar in size, design, and functionality as the lean casting 304 and spindle casting 306 of FIG. 3. Consequently, the front wheel of a motor grader, for example, can articulate about the steering axis 502 and lean axis 500 during machine operation.

Unlike the conventional design and layout of FIG. 3, the embodiment of FIGS. 4-6 includes an electric motor 408 and the corresponding wiring associated therewith. An example of an electric motor 408 contemplated by the present disclosure, but not limited to, includes the Remy HVH250 Series Electric Motors (e.g., the Remy HVH250 Standard or Remy HVH250HT). The electric motor 408 can include an end plate 516 that couples thereto and has defined openings through which the electrical wiring and connections of the motor 408 can be accessed. The end plate 516 is configured to couple the motor 408 to the lean casting 404.

In this embodiment, the electric motor 408 is larger in size than the hydraulic motor 310 of the conventional wheel hub 300. As a result, the size of the electric motor 408 is too large to be packaged in the conventional wheel hub 300 without there being a reduction in the overall performance of the machine. For instance, the repackaged final drive assembly would not meet the spacing constraints described above thereby causing the machine to experience reduced leaning and steering functionality. In addition, there may be wiring issues that arise as cables between the motor and other parts of the vehicle would have to flex for many steering and wheel lean movement thereby inducing problems in the wiring system.

As described above, a first space constraint relates to the ability of the machine to articulate about the steering axis and lean axis through a desired range of motion. The desired range of motion can include articulating about both axes by approximately 90° or more. In one non-limiting embodiment, it is desirable to articulate from −38.9° to 48.1° about the lean axis 500 and steering axis 502. In other embodiments, it may be desirable to articulate about both axes by different articulation angles. To achieve this range of motion, the lean casting 404 and spindle casting 406 cannot interfere or contact with one another during articulation. While one possible solution might be to change the design of either or both the lean casting and spindle casting, but in doing so the performance of the front axle will change (e.g., the manner in which a wheel leans, clearance with respect to ground, and loading on the axle). Thus, it is desirable to maintain the performance of the front axle by not altering the design of either casting.

In addition, a second constraint relates to the overall width and diameter of the wheel hub. Referring to FIG. 3, the desired diameter, $D_C$, and width, $W_C$, are illustrated. The diameter $D_C$ relates to a maximum dimension by which the final drive assembly is compactly packaged and the width $W_C$ relates to the maximum width occupied by the final drive assembly. To package the electric motor 408 into the final drive assembly 400 of FIGS. 4-6, there is no clutch assembly as required in the conventional assembly 300 of FIG. 3. In particular, the design of the electric motor 408 does not require a clutch assembly as needed for the conventional hydraulic motor design.

The final drive assembly 400 can also include a first bearing 412 and a second bearing 416 disposed between the spindle casting 406 and hub 402. A cover member 414 is disposed at least partially between the first bearing 412 and second bearing 416, and a retaining ring 418 can position the first bearing 412, second bearing 416, and cover member 414 between the spindle casting 406 and hub 402. A retainer plate 420 can be coupled to the spindle casting 406 such that the first and second bearings are disposed between the spindle casting 406 and retainer plate 420 (see FIG. 5). The final drive assembly 400 can further include a metal face seal or floating ring seal 410 as shown in FIGS. 4 and 5.

The removal of the clutch assembly and desirably sized seal 410, first bearing 412, and second bearing 416 allow the electric motor 408 to be positioned closer to the drive hub 402 (i.e., further into the final drive assembly) compared to the hydraulic motor. This is further illustrated in FIG. 3 where the steering axis 326 is disposed outside the width dimension, $W_C$, compared to the steering axis 502 of FIG. 5 which is disposed within the width dimension, W. As a result, the electric motor 408 can be packaged in the final drive assembly 400 and fit within a desired width constraint, W, and diametrical constraint, D. The width constraint, W, is defined between the drive or wheel hub 402 and end plate 516 of the motor 408. The diametrical constraint, D, is defined as the inner diameter of the hub 402. In at least one embodiment, $D \leq D_C$ and $W \leq W_C$. In another embodiment, D is approximately the same as $D_C$ and W is approximately the same as $W_C$. In the embodiment in which $D<D_C$ or $W<W_C$, additional space is created in the final drive assembly 400 to accommodate a higher-rated electric motor capable of producing more torque. Therefore, the embodiment of FIGS. 4-6 can have a flexible packaging arrangement to achieve a desired torque output.

Referring to FIGS. 5 and 6, the electric motor 408 can include a motor output 518 that couples to an output shaft 504. A planetary assembly can be driven by the output shaft 504. In particular, the planetary assembly can include a sun gear 506, a carrier and pinion gears 508, and a ring gear 510. In one aspect, the planetary assembly is the same as the planetary assembly 328 of FIG. 3, i.e., sun gear 506 is the same as sun gear 320, carrier 508 is the same as carrier 322, and ring gear 508 is the same as ring gear 324. In a different aspect, the planetary assembly may be different from the planetary assembly 328 (e.g., in terms of gear teeth, ratio, functionality, etc.), but still maintain the same size (e.g., width, diameter, etc.) thereof.

While exemplary embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A final drive assembly for powering a wheel of a machine, comprising:
   a hub adapted to support the wheel;
   a spindle casting coupled to the hub, the spindle casting at least partially defining a steering axis about which the wheel pivots;
   a bearing disposed within the hub, the bearing defining a plane aligned through a circumference of the bearing; and
   an electric motor including a housing and an output, the electric motor housing located in the spindle casting and the electric motor output positioned between the spindle casting and the hub; wherein the plane of the bearing intersects the spindle casting and the housing of the electric motor.

2. The final drive assembly of claim 1, further comprising a floating seal disposed between the spindle casting and the hub, the seal at least partially surrounding the electric motor.

3. The final drive assembly of claim 1, further comprising:
   a shaft coupled to an output of the electric motor; and
   a planetary gearset assembly coupled to the shaft, the planetary gearset assembly including a sun gear, carrier, and ring gear disposed within the hub.

4. The final drive assembly of claim 1, wherein the hub does not enclose a piston and clutch assembly.

5. The final drive assembly of claim 1, further comprising a lean casting coupled to the spindle casting and electric motor, the lean casting defining a lean axis about which the wheel pivots.

6. A final drive assembly for powering a wheel of a machine, comprising:
   a hub adapted to support the wheel;
   a spindle casting coupled to the hub, the spindle casting at least partially defining a steering axis about which the wheel pivots;
   a bearing disposed within the hub; and
   an electric motor including a housing and an output, the electric motor positioned between the spindle casting and hub;
   wherein the bearing at least partially surrounds the housing and output of the electric motor;
   further comprising a lean casting coupled to the spindle casting and electric motor, the lean casting defining a lean axis about which the wheel pivots; and further comprising an end plate coupled between the electric motor and lean casting, the end plate defining at least one opening for accessing an electrical portion of the motor.

7. The final drive assembly of claim 6, wherein an outer surface of the hub defines a first. plane and the end plate defines a second plane, the first plane and second plane being substantially parallel to one another;
   further wherein, the steering axis is disposed substantially parallel to and between the first and second planes.

8. The final drive assembly of claim 1, wherein the bearing comprises a first bearing spaced from a second bearing, where at least one of the first bearing and second bearing partially surrounds the electric motor.

9. The final drive assembly of claim 5, further comprising a floating seal disposed between the spindle casting and the hub, the seal at least partially surrounding the electric motor.

10. The final drive assembly of claim 9, further comprising:
    a cover at least partially disposed between the hub and the bearing; and
    a retainer plate disposed within the hub and coupled to the spindle casting;
    wherein, the cover is positioned between the bearing and retainer plate.

11. A final drive assembly of an electric vehicle, the electric vehicle including at least one wheel, comprising:
    a hub adapted to support the wheel;
    a spindle casting coupled to the hub and at least partially defining a steering axis about which the wheel articulates;
    a lean casting coupled to the spindle casting and defining a lean axis about which the wheel articulates;
    a bearing disposed within the hub; and
    an electric motor coupled to the lean casting and disposed between the spindle casting and hub;
    wherein, the bearing at least partially surrounds the electric motor; and further comprising an end plate coupled between the electric motor and lean casting, the end plate defining at least one opening for accessing an electrical portion of the motor.

12. The final drive assembly of claim 11, wherein the hub does not enclose a piston and clutch assembly.

13. The final drive assembly of claim 11, wherein an outer surface of the hub defines a first plane and the end plate defines a second plane, the first plane and second plane being substantially parallel to one another;
    further wherein, the steering axis is disposed substantially parallel to and between the first and second planes.

14. The final drive assembly of claim 12, wherein the bearing comprises a first bearing spaced from a second bearing, where at least one of the first bearing and second bearing partially surrounds the electric motor.

15. The final drive assembly of claim 11, further comprising:
    a cover at least partially disposed between the hub and the bearing; and
    a retainer plate disposed within the hub and coupled to the spindle casting;
    wherein, the cover is positioned between the bearing and retainer plate.

16. A final drive assembly of an electric vehicle, the electric vehicle including at least one wheel, comprising:
    a hub adapted to support the wheel;
    a spindle casting coupled to the hub and at least partially defining a steering axis about which the wheel articulates;
    a lean casting coupled to the spindle casting and defining a lean axis about which the wheel articulates;
    a bearing disposed within the hub; and
    an electric motor coupled to the lean casting and disposed between the spindle casting and hub;
    a cover at least partially disposed between the hub and the bearing;
    a retainer plate disposed within the hub and coupled to the spindle casting;
    wherein, the cover is positioned between the bearing and retainer plate; and further comprising an end plate coupled between the electric motor and lean casting, the end plate defining at least one opening for accessing an electrical portion of the motor.

17. The final drive assembly of claim 16, further comprising a floating seal disposed between the spindle casting and the hub, the seal at least partially surrounding the electric motor.

18. The final drive assembly of claim 17, further comprising:
   a shaft coupled to an output of the electric motor; and
   a planetary gearset assembly coupled to the shaft, the planetary gearset assembly including a sun gear, carrier, and ring gear disposed within the hub.

19. The final drive assembly of claim 18, wherein an outer surface of the hub defines a first plane and the end plate defines a second plane, the first plane and second plane being substantially parallel to one another;
   further wherein, the steering axis is disposed substantially parallel to and between the first and second planes.

* * * * *